United States Patent
Penn

(10) Patent No.: US 7,961,399 B2
(45) Date of Patent: Jun. 14, 2011

(54) SLM PROJECTION DISPLAY WITH SERIES DMD ILLUMINATOR

(75) Inventor: Steven M. Penn, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 12/165,898

(22) Filed: Jul. 1, 2008

(65) Prior Publication Data

US 2008/0266668 A1    Oct. 30, 2008

Related U.S. Application Data

(62) Division of application No. 11/548,099, filed on Oct. 10, 2006, now Pat. No. 7,394,597, which is a division of application No. 11/072,076, filed on Mar. 4, 2005, now Pat. No. 7,118,225, which is a division of application No. 10/186,734, filed on Jul. 1, 2002, now Pat. No. 6,863,401.

(60) Provisional application No. 60/301,975, filed on Jun. 30, 2001.

(51) Int. Cl.
    *G02B 27/14* (2006.01)
(52) U.S. Cl. .......... 359/634; 359/629; 359/638
(58) Field of Classification Search .......... 359/629, 359/618, 634, 638, 237, 242, 318, 320; 353/30–34, 353/37, 81, 84, 89, 94, 98, 99, 122; 349/5, 349/8, 196, 197, 202; 348/744, 750, 756–758, 348/771
See application file for complete search history.

(56) References Cited

U.S. PATENT DOCUMENTS

| | | | | |
|---|---|---|---|---|
| 4,969,730 A * | 11/1990 | van den Brandt | ............... | 353/31 |
| 5,644,432 A * | 7/1997 | Doany | ............... | 359/634 |
| 5,646,782 A * | 7/1997 | Anderson | ............... | 359/629 |
| 5,812,303 A | 9/1998 | Hewlett et al. | | |
| 5,844,588 A | 12/1998 | Anderson | | |
| 5,863,125 A | 1/1999 | Doany | | |
| 5,892,623 A * | 4/1999 | Bradley | ............... | 359/618 |
| 6,121,984 A | 9/2000 | Anderson | | |
| 6,144,420 A | 11/2000 | Jung | | |
| 6,334,685 B1 | 1/2002 | Slobodin | | |
| 6,406,148 B1 | 6/2002 | Marshall et al. | | |
| 6,568,815 B2 | 5/2003 | Yano | | |
| 6,654,156 B1 * | 11/2003 | Crossland et al. | ............... | 359/290 |
| 6,779,893 B2 | 8/2004 | O'Connor et al. | | |
| 6,863,400 B1 | 3/2005 | Liang | | |
| 6,930,797 B2 * | 8/2005 | Ramanujan et al. | ............... | 358/1.2 |
| 7,118,225 B2 | 10/2006 | Penn | | |
| 6,863,401 B2 | 1/2007 | Penn | | |
| 2003/0174293 A1 | 9/2003 | Hubel et al. | | |

* cited by examiner

*Primary Examiner* — Ricky L Mack
*Assistant Examiner* — Vipin M Patel
(74) *Attorney, Agent, or Firm* — Charles A. Brill; Wade James Brady, III; Frederick J. Telecky, Jr.

(57) ABSTRACT

The addition of DMD illumination modulator(s) 702 in series with projection SLM(s) 706/709 to produce high-performance projection displays with improved optical efficiency, reliability, and lower maintenance requirements. This approach eliminates the vibration, audible noise, and safety problems associated with high speed rotating color filter wheels 203 commonly used in SLM projectors and controls the light applied to individual areas of the projection SLM(s).

14 Claims, 6 Drawing Sheets

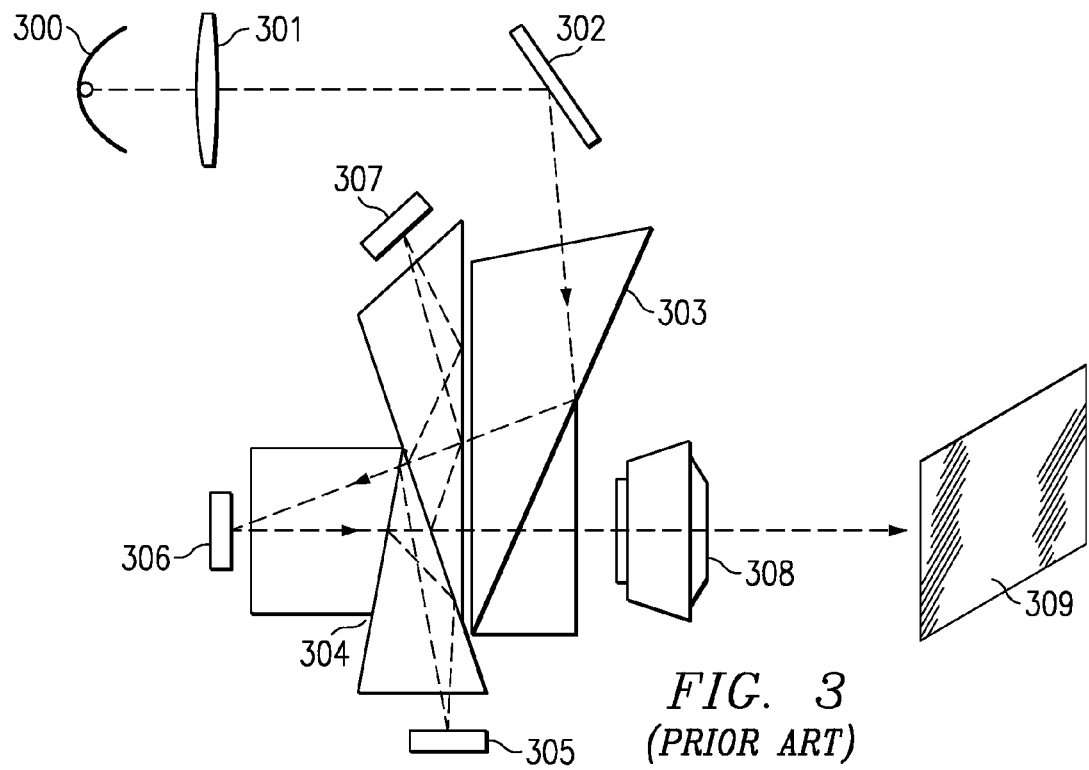
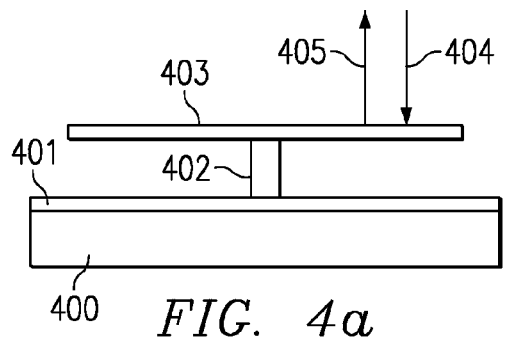
FIG. 4a
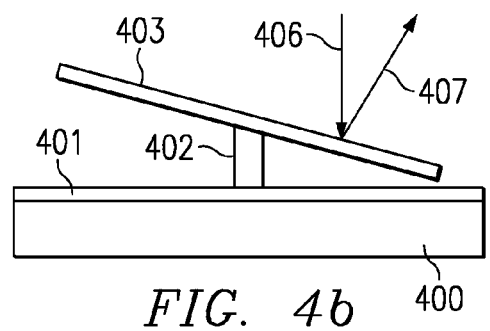
FIG. 4b
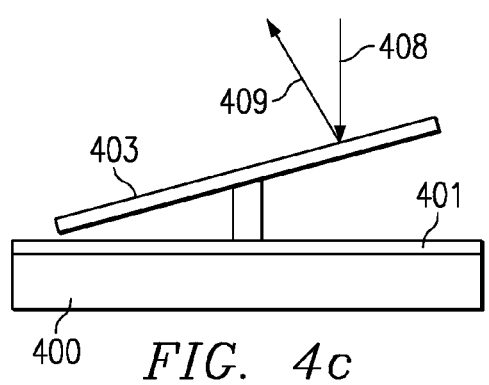
FIG. 4c
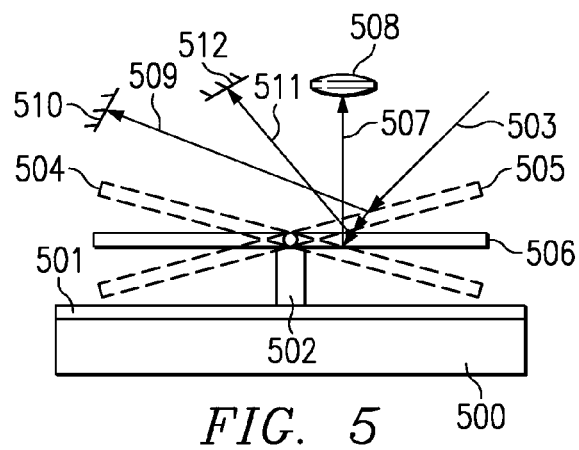
FIG. 5

SLM PROJECTION DISPLAY WITH SERIES DMD ILLUMINATOR

This application is a divisional of application Ser. No. 11/548,099, filed Oct. 10, 2006, which is a divisional of application Ser. No. 11/072,076, filed Mar. 4, 2005, now U.S. Pat. No. 7,118,225, which is a divisional of application Ser. No. 10/186,734, filed Jul. 1, 2002, now U.S. Pat. No. 6,863,401, which claims the benefit of provisional Application No. 60/301,975, filed Jun. 30, 2001.

FIELD OF THE INVENTION

The present invention relates to spatial light modulator (SLM) projection displays and particularly to the illumination source in such displays.

BACKGROUND OF THE INVENTION

In current SLM projection displays, such as DMD™ or LCD, the projector's lamp emits broadband (white) light, which is split into primary or secondary color components by dichroic surfaces in stationary prisms, mirrors, or rotating panels, such as color wheels or drums. These filtered planes of light are coupled to the projection SLM(s) in synchronization with pixelated image data. In the case of a DMD projector, the projection DMD's mirrors are controlled by the image data to be either in the correct state for color projection to the screen or out of the field of view. Integrators are often added to homogenize the illumination.

DMD based projection displays typically use rotating color wheels, which are optically inefficient, for color-plane separation. These color wheels require motors, balanced parts, and rotary sensors all of which contribute negatively to system reliability, size, safety, noise, maintenance, and cost. The relative duty cycle of each color is constant, determined by the relative dimensions of the filter panels. By design, the filter panels only let specific wavelengths of light through during their working phase, therefore wasting the light of otherwise useful wavelengths.

Other projectors employ stationary color beam splitters that use two or three defect-free SLMs to project distinct color plane images to the screen. In these systems, two or three projection SLMs are optically configured in parallel to pixelate and relay the three-color image planes. Stationary beam splitting prisms have to be precisely aligned (converged) and stabilized to avoid image drift. The projection SLMs require even more precise alignment to prevent out-of-focus images and these are position sensitive to thermal and structural stress.

While multiple projection SLMs in parallel have an advantage in optical efficiency, negative factors are lifetime stability, mis-convergence, maintenance, MTBF, cost, and limited contrast due to light scatter from the constant, full area SLM illumination.

Projectors are configured using one SLM for lower cost systems, two SLMs for higher performance systems, and three SLMs for very high brightness systems. All of these require very low defect projection SLM devices.

An example of a one-DMD projector with a rotating color wheel illumination system is shown in FIG. 1. In this case a light source, consisting of a lamp 100 and a collector 101, directs white light into a first condenser lens 102, which brings the light down to a small focused spot at the surface of a motor 104 driven rotating color filter wheel 103. The light is segmented into sequential red-green-blue primary colors by the color wheel and then resized to fit the DMD by a secondary condenser lens 105, placed in the light path. Sometimes an optional clear segment is added to the color wheel 103 for improved brightness. Light from this secondary condenser lens is focused on to the reflective surface of the DMD 106 where the micro-mirrors, which make up the matrix of pixels, are placed in binary states corresponding to the image data content, by the data path processor 107. Mirrors that are in the ON binary state modulate and reflect sequential color images through a projection lens 108 on to a viewing screen (not shown). The sequential color images projected on the screen are integrated by the observer's eyes to provide a high quality color image. This type projector is lower cost since only one SLM is required and it offers auto-convergence since the color images are exactly laid on top of each other.

FIG. 2a shows a typical configuration for a somewhat higher performance DMD projection display, which used two projection DMD's and a yellow-magenta rotating color wheel. White light from a color source (lamp/collector) 200 is directed into a first condenser lens 202 by a first turning mirror 201. This first condenser lens focuses the light down to a small spot at the surface of a motor 204 driven yellow-magenta color wheel 203. Sequential red-green and red-blue light coming through the color wheel is then resized by a secondary condenser lens 205 and then directed off the surface of a second turning mirror 206 into a total-internal-reflective (TIR) prism 207, which is used to get light into and off of the two DMDs 209/210. Light from the TIR prism 207 is coupled into a color splitting/recombining prism 208, where red light is reflected off an internal surface and focused on to the reflective surface of a first DMD 209 and sequential green-blue light is passed through the prism and focused on to the surface of a second DMD 210. The micro-mirrors of the two DMD's are placed into their binary states based on the image content by a data path processor 211. Red and green-blue light is then modulated by the DMDs and reflected out of the recombining prism 209, back through the TIR prism 207, and through a projection lens 212 on to a viewing screen (not shown).

FIG. 2b shows yet another even higher performance projection display configuration, which also has two projection DMDs and a blue-green rotating color wheel, but in this case the red light is split-off prior to the rotating color wheel. Here, white light from the source 250/collector 251 is directed to a mirror 252, which reflects red light along a first path, through condensing optics (not shown) on to the reflective surface of a first DMD 253, and passes green-blue light into a first condenser lens 254. This first condenser lens focuses the green-blue light down to a small spot at the surface of a motor 256 driven rotating color filter wheel 255. Sequential green and blue light coming through the color wheel is then resized to fit a second DMD 256 by means of a secondary condenser lens 258 and directed on to the surface of the DMD 258. This sequential green-blue light is modulated based on the green-blue image content by data path processor 259 and the red light is modulated based on the red image content by data path processor 260. The sequential green-blue modulated image and constant red modulated image are then combined by combining mirror 261 and the light is directed through a projection lens 262 on to a viewing screen (not shown).

FIG. 3 shows a three-DMD projection display, which provides the highest-performance, highest-brightness of those discussed. In this case there is no rotating color wheel, but the system splits the white light into three constant red, blue, green beams going to respective DMD modulators. Here, light from a white light source 300 is directed through a condenser lens 301 where it is sized and then turned by a turning mirror 302 and coupled into a TIR prism 303. The light is reflected off an internal surface of the TIR prism into a color splitting/recombining prism 304, where it is segmented into three continuous red, green, and blue beams, each being directed on to the reflective surface of a red 305, green 306, and blue 307 DMD. In each case the respective red, green, and blue light is modulated by the DMD micromirrors, based on the respective image content, and the respective color image is reflected back into the recombining prism 304. The recombined superimposed red-green-blue images are then directed back through the TIR prism 303, through a projection lens 308 and on to a viewing screen 309. Of course, these images have to be perfectly converged (aligned) in the optics plane to provide a well-focused picture on the screen.

All of these displays have drawbacks resulting from either using the rotating color wheel or from using an uncontrollable white light source. What is needed is a controllable light source that does not require the use of a rotating color wheel. The illumination approach of the present invention meets this need in numerous embodiments by using additional DMD illumination modulators to switch and control the light input to the projection modulators. These illumination modulators can usually have a certain number of defects as compared to the projection modulators, thereby allowing reject devices to be used. Often times the illumination modulators can be smaller in size; i.e., can have fewer pixels. In addition, the illumination modulators can be used to control the amount of light going to certain areas of the projection modulators to lower the dark level and improve the contrast of the projected image, as compared to using constant light levels in current systems. This approach increases the contrast in one-SLM projection systems and improves the optical efficiency in all DMD projection systems.

SUMMARY OF THE INVENTION

The present invention adds DMD illumination modulators in series with projection SLM(s) to produce high-performance projection displays with improved optical efficiency, reliability, and lower maintenance requirements.

This approach eliminates the vibration, audible noise, and safety problems associated with high speed rotating color filter wheels commonly used in SLM projectors. In addition, the DMD illumination modulators provide a means for controlling the light to each portion of the projection SLM(s), providing variable levels of each color to individual pixels of the projection SLM. For example, color illumination can be directed only to those specific areas on the projection SLM where it is needed, thus allowing lower dark levels and higher contrast for all images. Optimal coverage, frequency, duration, and level of each color can be provided to each projection SLM in order to at least double the optical efficiency of a projection system.

This solution increases contrast for all types of SLM projectors and increases the optical efficiency for one-SLM and two-SLM projection systems. The increased light efficiency also enables the use of lower power lamps for a given output brightness, thereby increasing the lamp life and lowering the system cost.

BRIEF DESCRIPTION OF THE DRAWINGS

For a more complete understanding of the present invention, and the advantages thereof, reference is now made to the following descriptions taken in conjunction with the accompanying drawings, in which:

FIG. 3 is a schematic drawing of a conventional three-SLM projection display, which uses a color splitting/recombining prism to provide uncontrolled, fixed red, green, and blue light to the respective SLMs.

FIG. 4 is a drawing illustrating the three operating states for a DMD; i.e., micro-mirrors tilted positive x degrees, tilted negative x degrees, and tilted zero degrees (flat state).

FIG. 5 is a drawing illustrating the input and reflective output of light for a DMD used with dark field optics.

DETAILED DESCRIPTION OF THE PREFERRED EMBODIMENTS

Figure 1:
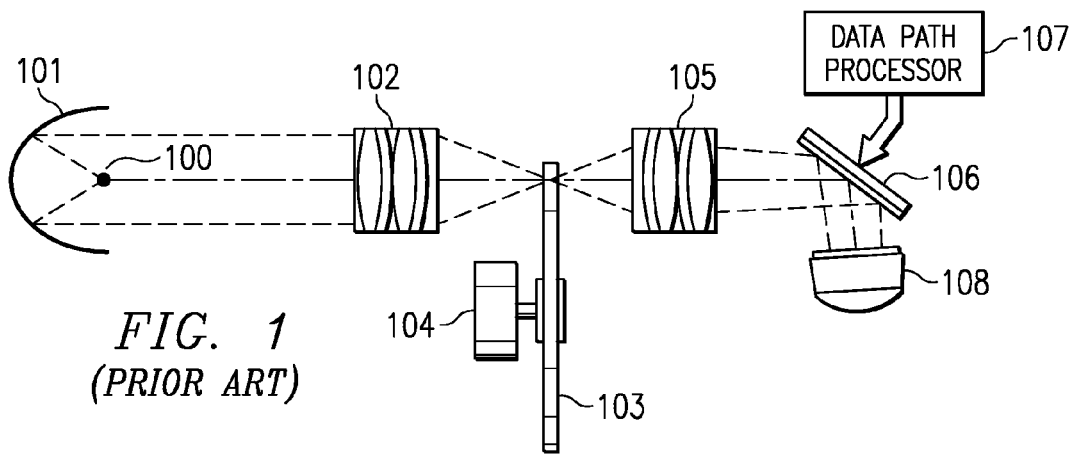
FIG. 1 is a schematic drawing of a conventional one-SLM projection display, which uses a rotating red-green-blue color filter wheel to provide sequential red, green, and blue light to the projection SLM.

The present invention adds DMD illumination modulators in series with projection SLM(s) to produce high-performance projection displays with improved optical efficiency, reliability, and lower maintenance requirements. This approach eliminates the vibration, audible noise, and safety problems associated with high speed rotating color filter wheels commonly used in SLM projectors. In addition, the DMD illumination modulators provide a means for controlling the light to each portion of the projection SLM(s), providing variable levels of each color to individual pixels of each SLM.

Where lower cost, user-friendly projectors are required, such as in home theater or consumer TVs, the present invention eliminates the need to manually set convergence while being more power efficient than other projectors offering similar brightness. Concurrently, this invention increases contrast and greatly increases the optical efficiency of single-SLM projection systems.

The invention is discussed in seven embodiments in the following text.

FIG. 4 is a drawing illustrating the three operating states for a DMD; i.e., (a) micro-mirror tilted zero degrees (flat state), (b) tilted positive x degrees, and (c) tilted negative x degrees. These states are all used to implement the various embodiments of the present invention. FIG. 4a is a sketch of a DMD, which includes a substrate 400 with a built-in memory structure, and isolation layer 401 with interconnect vias covering the substrate, and a highly reflective micro-mirror 403 attached to torsion hinges 402 on top of the isolation layer. Here the mirror 403 is shown in the tri-state or flat condition. Incoming light 404 that is perpendicular to the mirror surface is reflected 405 straight back into the source, as shown.

FIG. 4b illustrates the case where the micro-mirror 403 is tilted positive x degrees (typically +10°). The mirrors are tilted by applying an electric field between the address electrodes and the mirrors, which generates electrostatic forces that cause the mirrors to rotate on their axes. Depending on the binary state stored in the data content memory cell below each mirror, the rotational force is either positive or negative. In this case, the incoming illumination 406 is perpendicular to the surface of the device and the reflected illumination 407 is +20° off axis from the input illumination.

Similarly in FIG. 4c, the micro-mirror 403 is tilted negative x degrees (typically −10°). In this case, the incoming illumination 408 is perpendicular to the surface of the device and the reflected illumination 409 is −20° off axis from the input illumination.

FIG. 5 illustrates another illumination case where the illumination DMD is used with dark field optics. This shows the substrate 500, isolation layer 501, and a micro-mirror, attached to torsion hinges 502 (side view), in the three states; i.e., rotated +x degrees 504, flat 506, and rotated −x degrees 505. In this case, the illumination 503 comes in +20° off-axis from the surface of the device and reflects off the micro-mirror 90°, 70°, and 50° relative to surface of the device for the +x degree, flat, and −x degree states, respectively.

Figure 6:
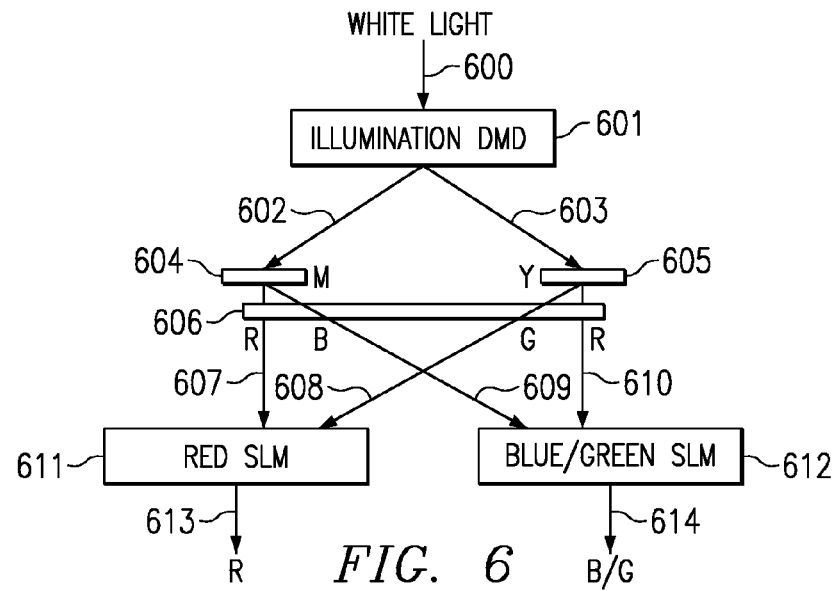
FIG. 6 is a diagram illustrating the use of a single DMD illumination device and dichroic mirrors to provide separable red and green-blue light for use in two-SLM projection displays.

FIG. 6 is a diagram illustrating the use of a single DMD illumination device and dichroic mirrors to provide separable red and green-blue light for use in two-SLM projection displays. Here, white light 600 from a lamp is directed on to the surface of the illumination DMD 601 in the manner discussed in FIG. 4, with only the two binary states (+x and −x tilt angles) being used. Light coming off the illumination DMD in the +x degree direction 603 is coupled to a yellow dichroic mirror 605 with red-green light being reflected off the dichroic. Likewise, light coming off the illumination DMD in the −x degree direction 602 is coupled to a magenta dichroic mirror 604 with red-blue light being reflected off the dichroic. This red-green and red-blue light is then passed through a red dichroic 606 with the red light 607/608 being directed to the red projection SLM 611 and the blue 609 and green 610 light being sequentially directed to the blue-green projection SLM 612. This provides a continuous red modulated image 613 and sequential blue and green images 614 to a projection lens without the use of a rotating color wheel. The illumination DMD 601 can be used to completely control the light to individual areas of the projection SLMs.

Figure 2A:
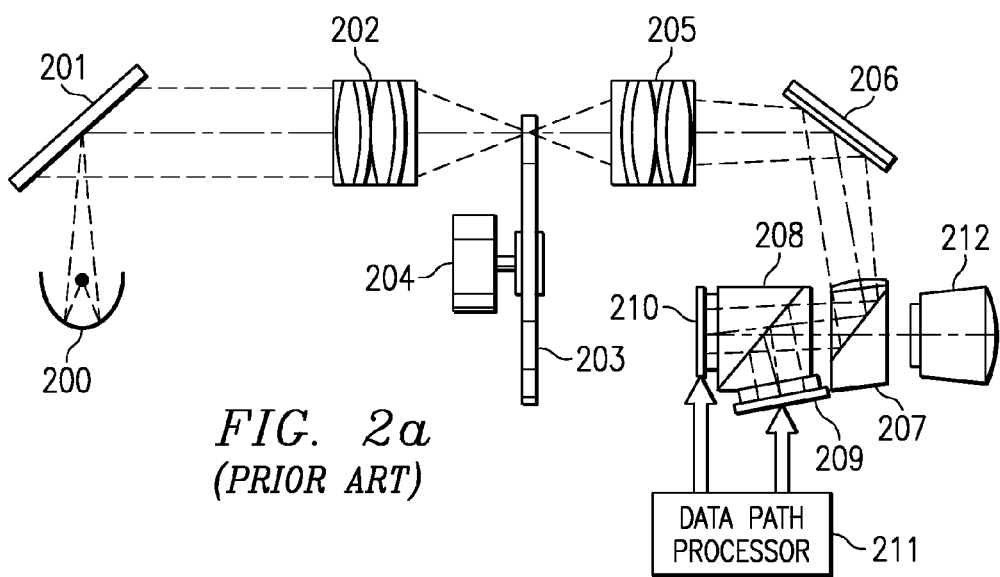
FIG. 2a is a schematic drawing of a conventional two-SLM projection display, which uses a rotating yellow-magenta color filter wheel and color splitting/recombining optics to provide continuous red light to one projection SLM and sequential green and blue light to the other projection SLM.
Figure 7A:
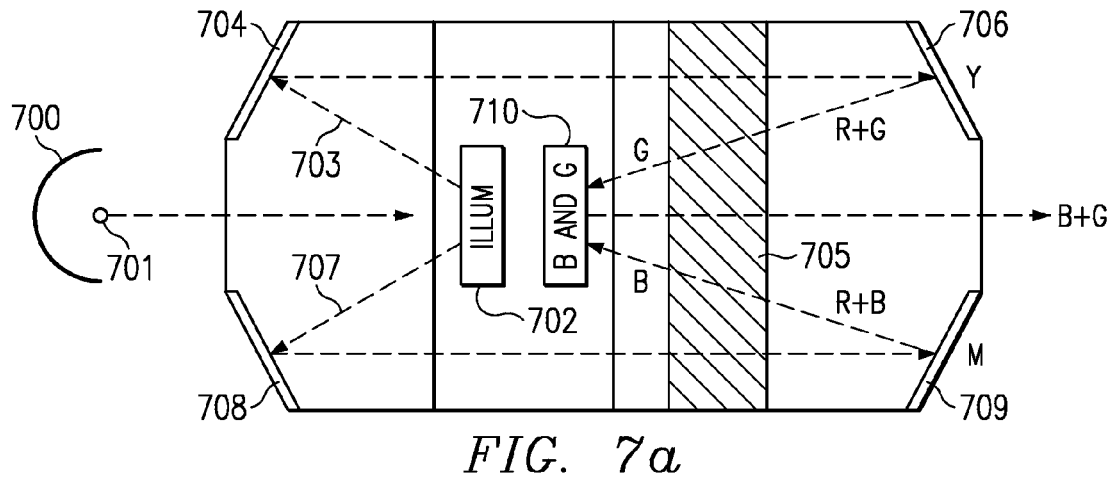
FIG. 7 is a schematic drawing for a first embodiment of the present invention, which uses a single illumination DMD in series with the two parallel projection SLMs to implement an improved version of the system of FIG. 2a without a rotating color wheel.
Figure 7B:
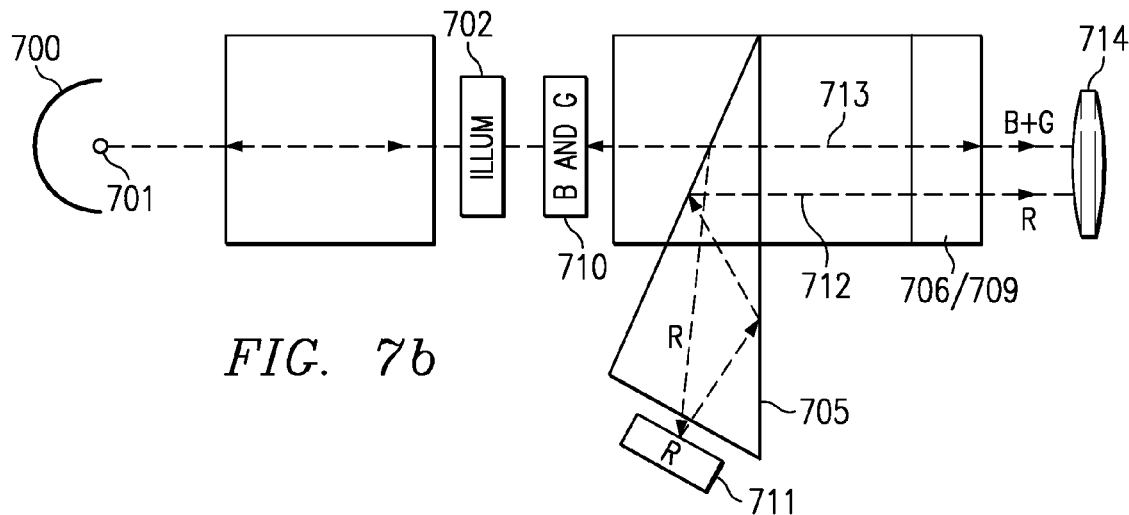

FIGS. 7a and 7b are top and front views of a schematic drawing for a first embodiment of the present invention, which uses a single illumination DMD in series with the two parallel projection SLMs to implement an improved version of the system of FIG. 2a without a rotating color wheel and using the yellow-magenta dichroic scheme discussed in FIG. 6. White light from a lamp 701 is collected by a reflector 700 and directed on to the surface of an illumination DMD 702 in a direction perpendicular to the surface of the DMD. The micro-mirrors are sequentially switched between +x degrees and −x degrees with light reflecting from the mirrors when tilted in the +x direction 703 being reflected off a first turning mirror 704, through a red dichroic 705, on to the surface of a yellow dichroic 706. Light reflecting from the mirror when tilted in the −x direction 707 is reflected off a second turning mirror 708, through the red dichroic 705, on to the surface of a magenta dichroic 709. The red-green light reflected off the yellow dichroic 706 is split apart by the red dichroic 705 with the red light being reflected on to the surface of a dedicated red projection SLM 711 and the green light being directed through the red dichroic on to the surface of a blue-green projection SLM 710. Likewise, the red-blue light reflected off the magenta dichroic 709 is also split apart by the red dichroic 705 with the red light being reflected on to the surface of the dedicated red projection SLM 711 and the blue light being directed through the red dichroic on to the surface of the blue-green projection SLM 710. Finally, the continuous red modulated image 712 from the dedicated red projection SLM 711 and the sequential blue-green image 713 from the blue-green projection SLM 710 are reflected into the aperture of a projection lens 714 for focusing on a viewing screen (not shown).

The approach of the present invention eliminates certain artifacts associated with rotating color wheels by adjusting the frequency and duration of each color separation DMD pixel. Variable levels of each color can be transmitted to each pixel from 0-100% of the available energy for a particular color. Color illumination can be directed only to those specific areas on the projection SLM where it is needed, thus attaining optimal dark level conditions and thereby improved contrast for all images. Optimum coverage, frequency, duration, and level of color light exposure at each projection SLM pixel can be maintained.

Optical efficiency (ratio of lumens input over lumens output) for a conventional single projection DMD projector with color wheel is typically 10%. The use of the DMD color filter illumination method of the present invention can double this efficiency to 20% in many applications.

Also, it is not necessary that the illumination DMD have the same number of pixels as the projection SLM and the illumination DMD can have a certain number of defects (inoperable micro-mirrors) depending on the application. This allows the rotating color wheel to be replaced by an assembly that uses reject DMD(s).

Figure 2B:
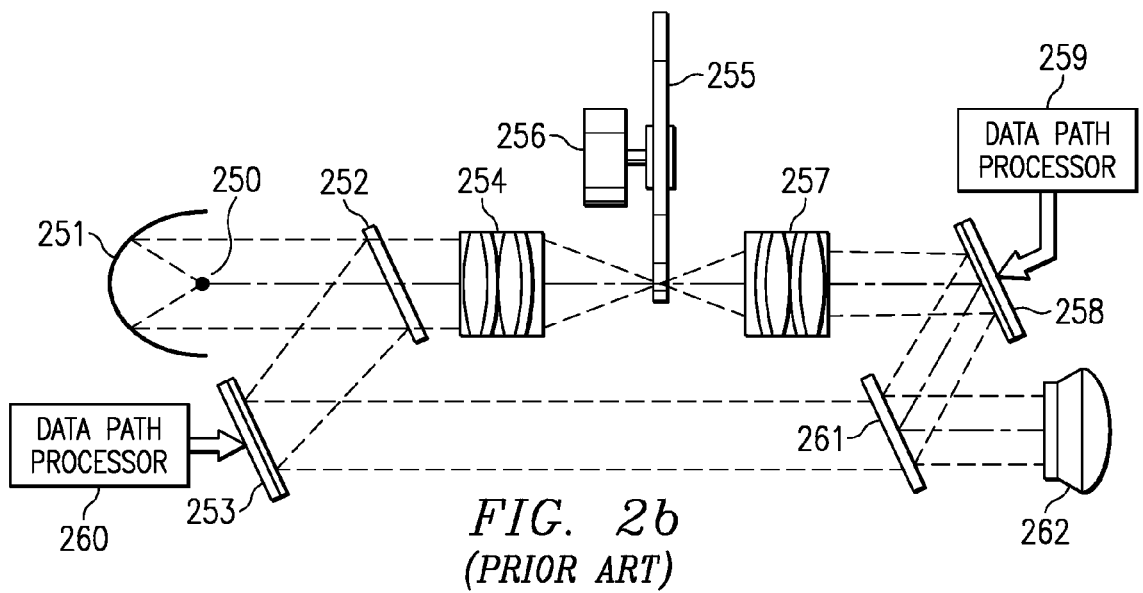
FIG. 2b is a schematic drawing of a conventional two-SLM projection display, which splits red light off to one SLM and uses a rotating green-blue color filter wheel to provide sequential green and blue light to the other SLM.
Figure 8:
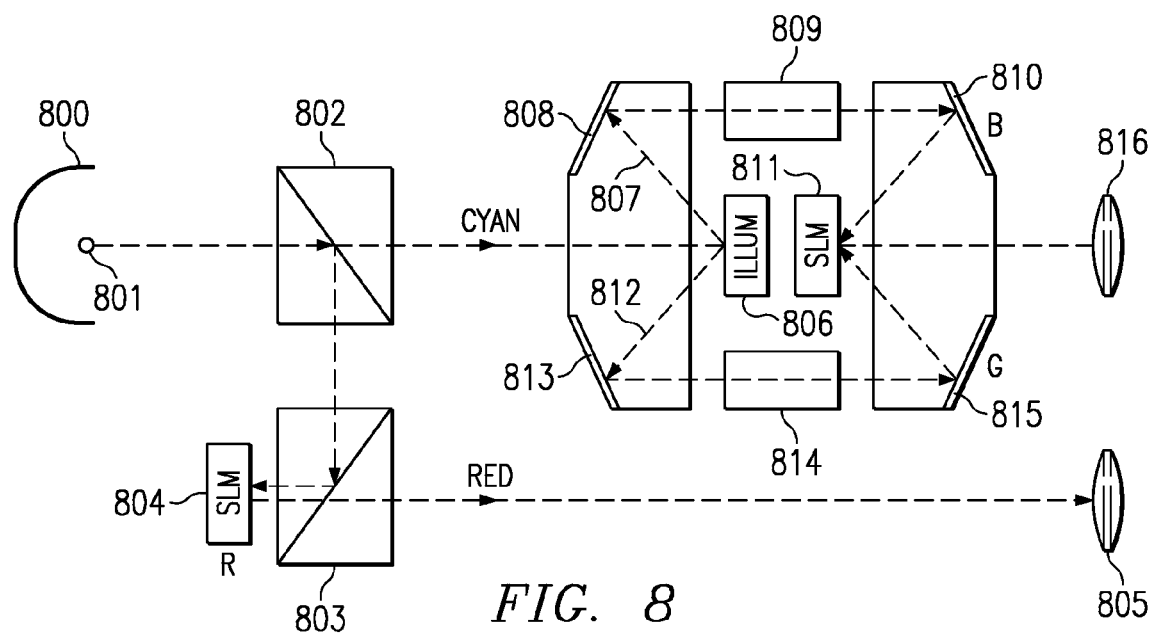
FIG. 8 is a schematic drawings for a second embodiment of the present invention, which also uses a single illumination DMD in series with green-blue projection SLM, but splits off the red light and sends it directly to a dedicated red SLM to implement an improve version of the system of FIG. 2b without a rotating color wheel.

FIG. 8 is a schematic drawing for a second embodiment of the present invention, which also uses a single illumination DMD in series with green-blue projection SLM, but splits off the red light and send it directly to a dedicated red SLM to implement an improve version of the system of FIG. 2b without a rotating color wheel. White light from a lamp 801 is collected by reflector 800 and directed into a first TIR prism 802 where the red light is reflected off an internal surface into a second TIR prism 803. Here, the red light is again reflected off an internal surface on to the reflective surface of the red SLM 804, where it is modulated based on the red image data content and reflected from the ON pixels of the SLM back through the second TIR prism 803 into a projection lens 805. In parallel, cyan light passes through the first TIR prism 802 on to the micro-mirrors of an illumination DMD 806 along a path that is perpendicular to the surface of the DMD. The micro-mirrors of the illumination DMD 806 sequentially switch between +x degrees and −x degrees with light reflecting from the mirrors when tilted in the +x direction 807 being reflected off a first turning mirror 808, through a first lens with an integrator or diffuser 809, on to the surface of a blue dichroic 810. Light reflecting from the mirrors when tilted in the −x direction 812 is reflected off a second turning mirror 813, through a second lens with an integrator or diffuser 814, on to the surface of a green dichroic 815. The blue light reflected off the blue dichroic 810 is then sequentially reflected on to the surface of a projection blue-green SLM 811. Likewise, the green light reflected off the green dichroic 815 is also sequentially reflected on to the surface of the blue-green projection SLM 811. Finally, the sequential blue-green light is sequentially modulated based on the data content of the blue and green images, respectively, and sequentially reflected from the blue-green projection SLM 811 into the aperture of a second projection lens 816 for focusing the image on a viewing screen. Optionally, a single projection lens can be used, but in either case the red and blue-green images must be converged for a well-focused image. However, in this arrangement the convergence occurs at the much larger screen dimensions compared to typical alignment in the optics plane.

Figure 9:
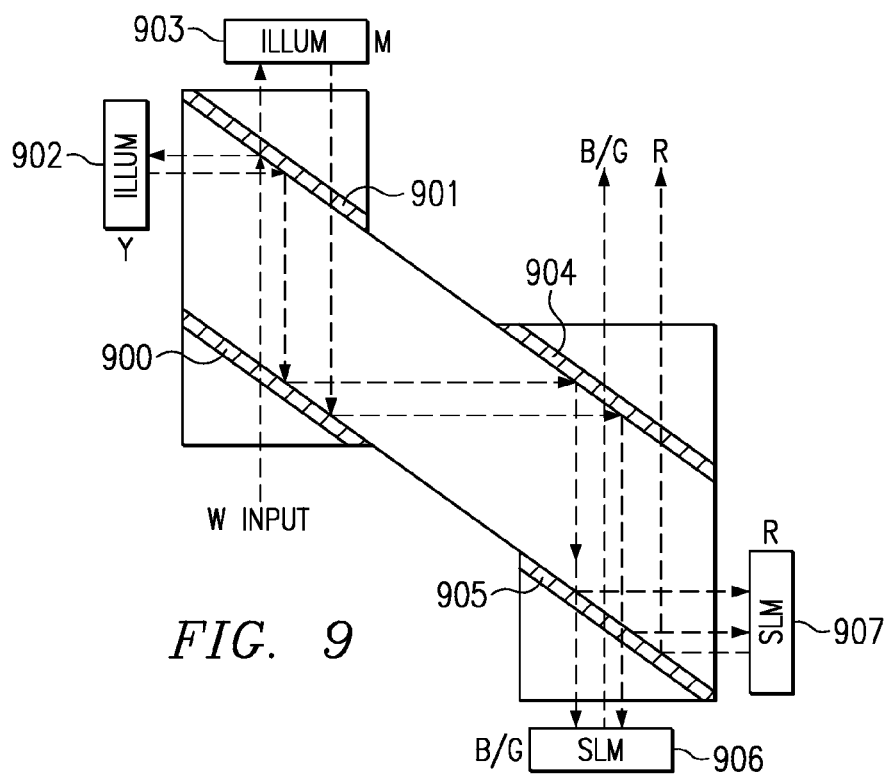
FIG. 9 is a schematic diagram for a third embodiment of the present invention, which uses two illumination DMDs in series with two projection SLMs to implement an improve performance projection display system without a rotating color wheel.

FIG. 9 is a schematic drawing for a third embodiment of the present invention, which uses two illumination DMDs in series with two projection SLMs to implement an improve performance projection display system without a rotating color wheel. In this configuration, white light from a light source (not shown) is passed through a first turning mirror 900 onto the surface of a yellow dichroic 901 from which yellow (red-green) light is reflected into a first yellow illumination DMD 902 and magenta (red-blue) light is passed through on to the surface of a second magenta illumination DMD 903. The yellow and magenta light is respectively modulated to optimally control the system performance by means of these two illumination DMDs. Modulated light from the yellow illumination DMD 902 is reflected off the ON micro-mirrors back on to the yellow dichroic 901. This light is then reflected off the yellow dichroic 901, off the reflective surface of the first turning mirror 900, off the reflective surface of a second turning mirror 904, through a red dichroic 905, on to the reflective surface of a blue-green SLM 906. Similarly, the modulated light from the magenta illumination DMD 903 is passed back through the yellow dichroic 901, off the reflective surface of the first turning mirror 900, off the reflective surface of the second turning mirror 904, off the surface of the red dichroic 905, on to the reflective surface of a red SLM 907. A modulated red image is then reflected from the ON pixels of the red SLM 907, off the red dichroic 905, and into a projection lens (not shown). Likewise, sequential modulated blue and green images are reflected from the ON pixels of the blue-green SLM 906, through the red dichroic 905, into the projection lens. In operation, by turning the yellow illuminator 902 and magenta illuminator 903 ON and OFF out of phase with an optimized duty cycle and then filtering the light as discussed above, sequential blue-green light is provided to the blue-green SLM 906 and continuous red light is provided to the red SLM 907.

Figure 10:
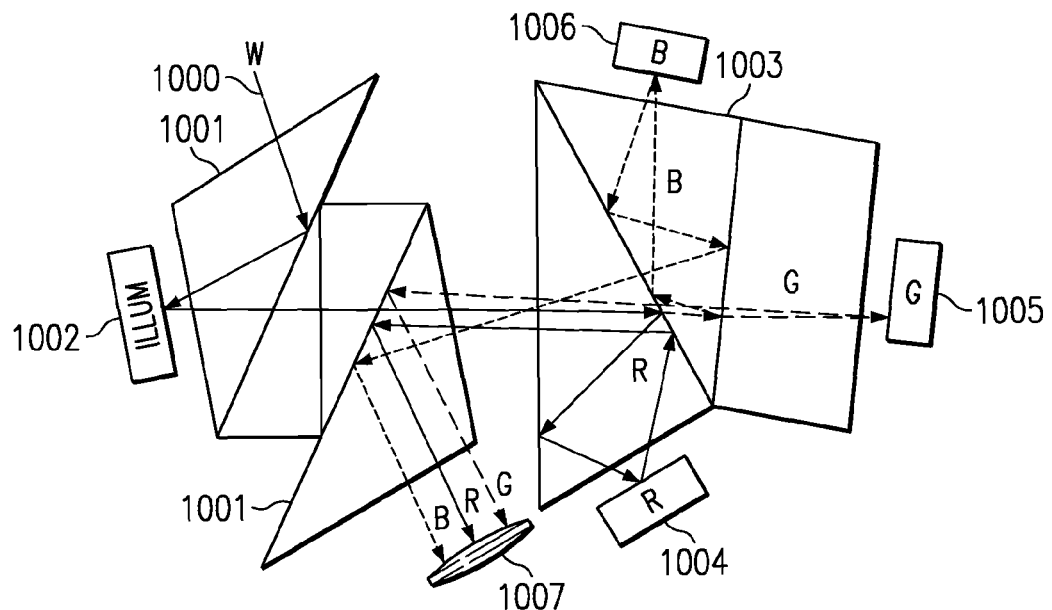
FIG. 10 is a schematic drawing for a fourth embodiment of the present invention, which uses a single illumination DMD in series with the three parallel projection SLMs to implement an improved version of the system of FIG. 3, but with controlled light properties for each of the three SLMs.

FIG. 10 is a schematic drawing for a fourth embodiment of the present invention, which uses a single illumination DMD in series with the three parallel projection SLMs to implement an improved version of the system of FIG. 3, but with controlled light properties for each of the three SLMs. In this embodiment, white light is directed into a TIR prism 1001 where it is reflected off a first internal surface on to the reflective surface of an illumination DMD 1002. Controlled light from this illumination DMD is reflected off the chip's micro-mirrors, through the TIR prism 1001, into a color splitting/recombining prism 1003, where it is broken into the three primary beams and directed to dedicated red, green, and blue SLMs 1004-1006, respectively. The three (red, green, and blue) modulated color images are then reflected off the respective SLMs and recombined in the recombining prism 1003 and directed back into the TIR prism 1001, where it is reflected off a second internal surface into a projection lens 1007.

In operation, the TIR prism 1001 is used to get light into and out of color splitting/recombining prism 1003. Since there is no color wheel involved in the conventional version of the system, as illustrated in FIG. 3, the illumination DMD 1002 is used solely to control the light to different portions of the three SLMs 1004-1006.

Figure 11A:
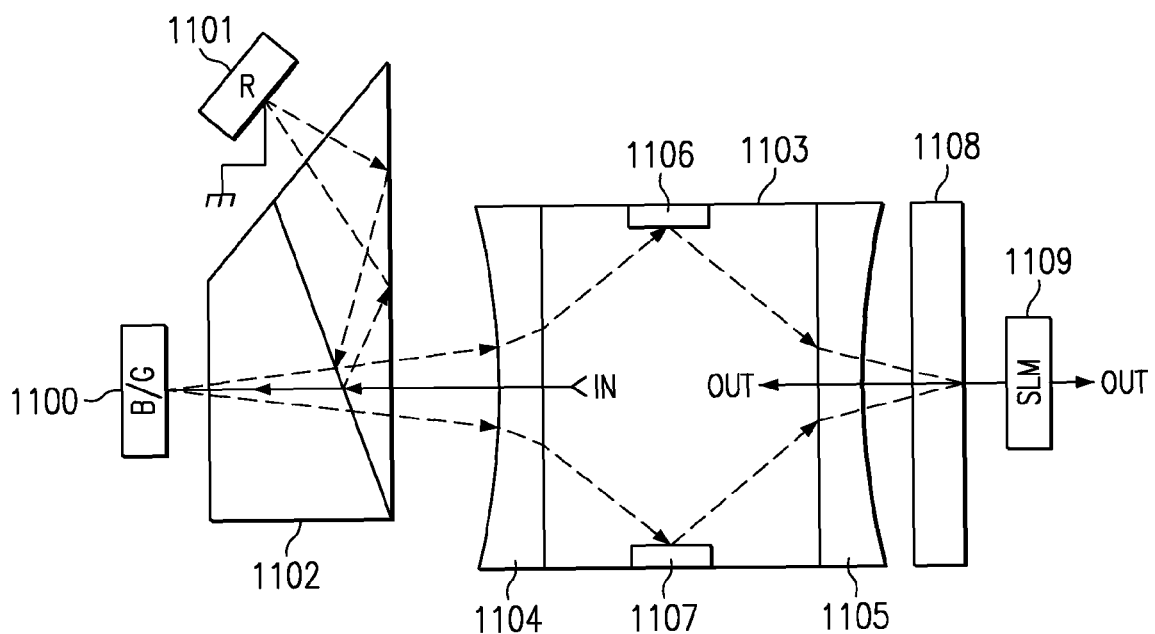
FIG. 11 is a schematic diagram for a fifth embodiment of the present invention, which uses two illumination DMDs in series with a single projection SLM to implement an improve version of the system of FIG. 1 without a rotating color wheel.
Figure 11B:
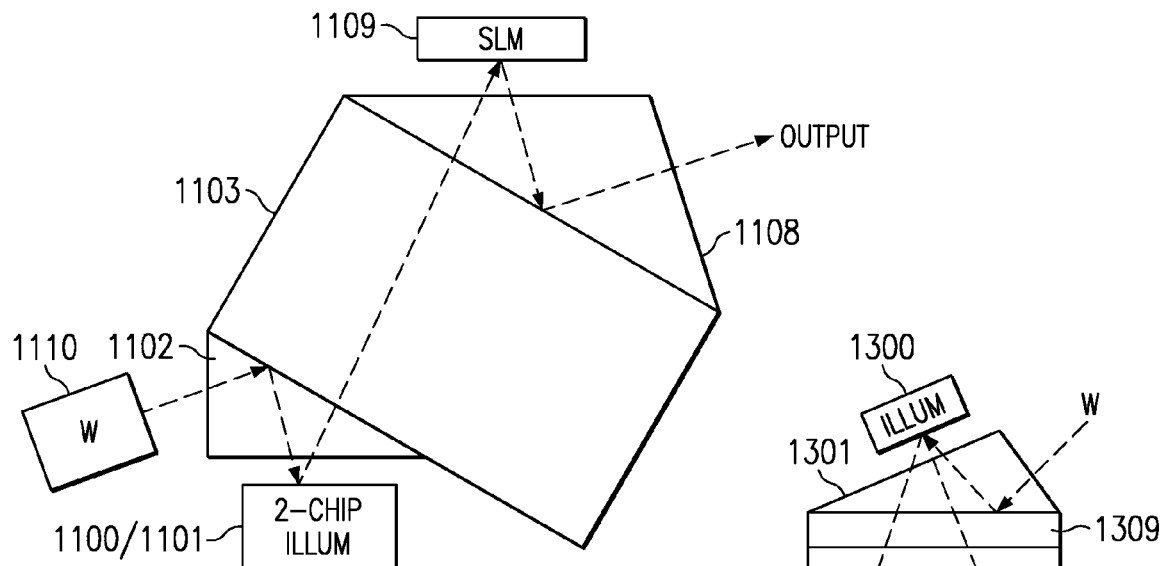

FIG. 11 is a schematic drawing for a fifth embodiment of the present invention, which uses two illumination DMDs in series with a single projection SLM to implement an improved version of the system of FIG. 1 without a rotating color wheel. In this embodiment, white light 1110 is directed into an input TIR prism 1102, where red light is reflected off an internal surface on to the surface of a red illumination DMD 1101 and blue-green light passes through the input TIR prism on to the surface of a blue-green illumination DMD 1100. Since this configuration is for a single-chip SLM projector, the applied light needs to be sequential red-green-blue. Therefore, the red illumination DMD 1101 is turned ON (micro-mirrors tilted +x degrees) for a portion of the field and OFF (micro-mirrors tilted −x degrees) for the remainder of the field when green or blue light is being supplied. On the other hand, the micro-mirrors of the green-blue DMD 1100 are placed in one binary position (say +x degrees) to supply green light and in the other binary position (−x degrees) to supply blue light. During the time that red light is being supplied, the green-blue DMD 1100 is placed in the tri-state (flat) position, as described in FIG. 4a. This mode of operation provides the necessary sequential red-green-blue illumination to the projection SLMs. The red light is modulated (controlled) by the red illumination DMD 1101 and reflected back into the input TIR prism 1102 where it is reflected off an internal surface. Similarly, the green and blue light is modulated by the green-blue illumination DMD 1100 and also passed back through the input TIR prism 1102. Then this available sequential red-green-blue controlled light is supplied to the input of an optical triplet 1103-1105, consisting of an input concave lens 1104, a yellow-magenta dichroic section 1103, and an output concave lens 1105. When green light is available from illumination DMD 1100, it is bent towards a yellow dichroic 1106 where it is reflected back through the output concave lens 1105, in order to straighten out its path, through an output TIR prism 1108, on to the surface of the single projection SLM 1109. The output TIR prism 1108 is used to get the light on to and off of the projection SLM 1109. Likewise, when blue light is available from illumination DMD 1100, it is bent towards a magenta dichroic 1107 where it is reflected back through the output concave lens 1105, through the output TIR prism 1108, on to the surface of the single projection SLM 1109. Again, during the time that green and blue light is being supplied the red illumination DMD 1101 is turned OFF. To supply red light, first the green-blue illumination DMD 1100 is put in the tri-state (flat) position and the red illumination DMD 1101 is turned to the ON binary state. Depending on which binary state is chosen as the ON state, the red light will follow the path of either the green or blue light through the triplet 1103-1105 and on to the surface of the projection SLM; e.g., the green path leading to the yellow dichroic 1106 is shown in the drawing. Finally, the sequential red, green, and blue images are modulated by the projection SLM, according to the image's color plane content, and reflected off the reflective surface back through the output TIR prism 1108 into a projection lens (not shown).

Not only does this embodiment provide complete control of the light to individual pixels on the projection SLM 1109, but the output TIR prism 1108 establish correct working distances and enables separation of a desirable f/3 optical input cone from the DMDs output cone.

Table 1 shows the states for this two illumination DMD approach, which utilizes the two binary states and the tri-state of the two illumination DMD's 1100/1101.

TABLE 1

|  | R | B/G |
|---|---|---|
| RED | ON | TRI-STATE |
| GREEN | OFF | G |
| BLUE | OFF | B |

Figure 12:
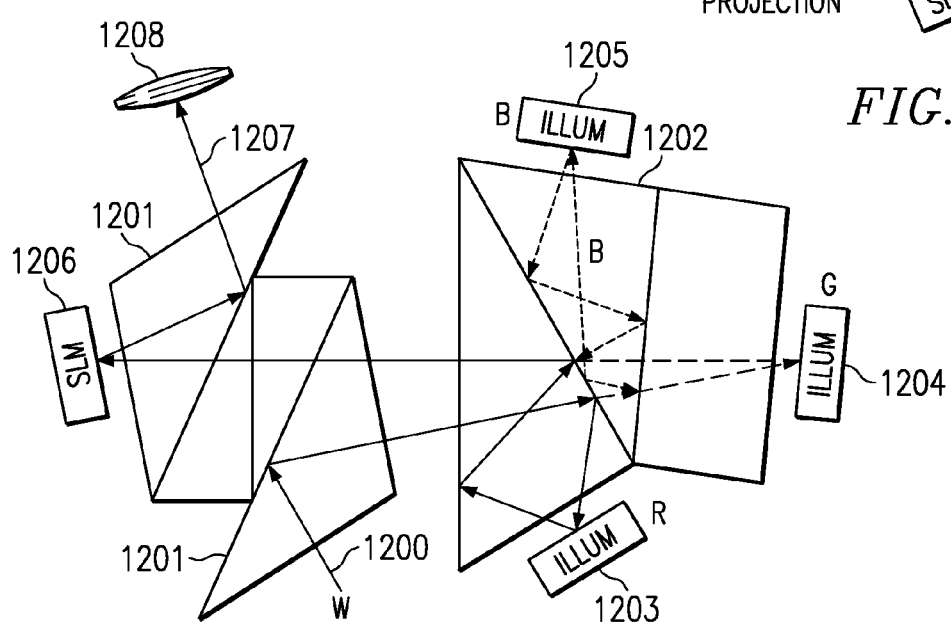
FIG. 12 is a schematic diagram for a sixth preferred embodiment of the present invention, which uses three illumination DMDs in series with a single projection SLM to implement an improve version of the system of FIG. 1 without a rotating color wheel.

FIG. 12 is a schematic drawing for a sixth preferred embodiment of the present invention, which uses three illumination DMDs in series with a single projection SLM to implement an improve version of the system of FIG. 1 without a rotating color wheel. Here, three-beam splitters for red, green, and blue chroma are in series with three-color separation illumination DMDs. This approach offers fully addressable rays of single color, such as red, green, and blue for a single-SLM system, or yellow and magenta for a two-SLM system. These modulated, fully addressable rays allow for sized bundles of color illumination to be transmitted to specific areas on the defect free projection SLM(s). In this case, white light 1200 is supplied to an input/output TIR prism 1201, used to separate the incoming and outgoing illumination, where it is reflected off an internal surface and directed into a color splitting/recombining prism 1202. The light is split into three primary beams (red, green, and blue) and directed by the prism to respective red 1203, green 1204, and blue 1205 illumination DMDs. These DMDs are turned ON and OFF sequentially, modulating the light for optimal projector performance and reflecting the sequential red-green-blue light beam back through the recombining prism 1202, keeping the color images converged, and back through the input/output TIR prism 1201, on to the reflective surface of the projection SLM 1206. The projection SLM then sequentially modulates the color images according to the color image content and reflects them back input the TIR prism 1201 where they are reflected off an internal surface through a projection lens 1208 on to a viewing screen (not shown). This is the high-end approach to replacing the color wheel in a single-SLM projector with illumination DMDs since individual DMDs are used to control each of the three primary color planes. One example would be to use the illumination DMDs 1203-1205 to remove the light in areas of the SLM 1206 where it should be dark in order to improve the contrast of the projected image.

Figure 13:
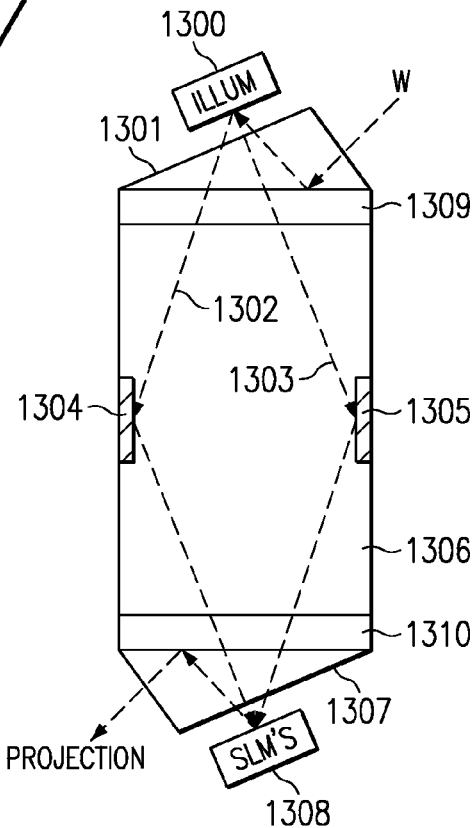
FIG. 13 is a schematic diagram for a seventh embodiment of the present invention, which uses one or more illumination DMD with one or more projection SLM with emphasis on keeping all optical paths equal length in order to implement an improve version of the system of FIG. 1 without a rotating color wheel.

FIG. 13 is a schematic diagram for a seventh embodiment of the present invention, which uses one or more illumination DMDs with one or more projection SLMs with emphasis on keeping all optical paths equal length in order to implement an improve version of the system of FIG. 1 without a rotating color wheel. In this generic embodiment, one, two, or three illumination DMDs 1300 are used with one, two, or three projection SLMs 1308 to provide an optimal performance projection system with fast switching and controllable illumination. White light is directed into a input TIR prism 1301, where it is reflected off an internal surface and on to the surface of the illumination DMD(s) 1300. Controlled light from these DMDs is reflected back through the TIR prism 1301 along two paths 1302/1303, on to additional TIR surfaces or mirrors 1304/1305, through an output TIR prism 1307, to the respective projection SLM(s) 1308. These SLM (s) then modulates the images according to color and gray level content, and then reflects them back through the output TIR prism 1307 to a projection lens. Optional diffusers, diffraction gratings, or integrating elements 1309/1310 can be added in the input and output paths for additional optical optimization. In the case where the illumination DMDs have stuck-on or stuck-off pixels, these diffusers, diffraction gratings, or integrating elements can mask the defects without negative effects on the viewing screen.

In some configurations, it is permissible for the illumination DMDs to modulate specific areas of illumination so that an integrator is not required to provide uniform illumination. Also, the placement order of the various lenses, integrators, diffusers, and dichroic surfaces (mirrors and prisms) before or after the illumination DMDs and/or projection SLMs is a system design issue for which many options are available.

In a system where multiple color separation illumination DMD(s) are used in series with the projection SLM(s) to separate, then gate the color rays to the viewing screen, electronic convergence of the color separation DMD(s) can be enabled with appropriately designed test targets. The modulation frequency and duration of the color separation DMD(s) may be synchronized with the projection SLM(s) and adjusted in real-time to varying image requirements. It may also be desirable to control the relative timing of the DMDs to mask other image defects or screen properties. Digital Signal Processors (DSPs) may be employed to process time critical data for these and other image adjustments.

The illumination can be dimensionally adjusted electronically to accommodate various image display formats such as 4:3, 16:9, letterbox, and future High Definition TV standards. Additional optics, such as anamorphic lenses or diffraction gratings may be used to redistribute the illumination to the aspect ratio desired on the viewing screen.

In these projectors, the color separation DMDs can often be placed in the assembly without precision alignment or convergence mechanisms and the associated labor. Instead, automated cameras and electronic controls can be used to verify the x, y, z, and theta illumination alignment at the projector output. The illumination pattern for each color is adjusted by addressing the appropriate mirrors on each color separation (illumination) DMD, corresponding to the image pattern from the projection SLM. When a test pattern is the brightest and most uniform as detected by the camera (or technician), the illumination rays of each illumination DMD are correctly mapped (converged) to the projection SLM. If required, the illumination pattern can be scaled as well, in terms of overall size or individual pixel coverage. In the latter case, more or less illumination DMD pixels are assigned to the projection SLM pixels, thereby maximizing the dark levels at the viewing screen.

While the present invention has been described in the context of several embodiments, it will be apparent to those skilled in the art that the invention may be modified in numerous ways and may assume embodiments other than that specifically set out and described above. Accordingly, it is intended by the appended claims to cover all modifications of the invention that fall within the true spirit and scope of the invention.

What is claimed is:

1. A display system comprising:
 a light source;
 a first light modulator;
 a second light modulator;
 an image plane;
 a first interface on a first optical path from said light source to said first light modulator, and on a second optical path from said first light modulator to said second light modulator, said first interface configured to transmit light on one of said first and second light paths, and to reflect light on the other of said first and second light paths;
 a second interface on said second optical path from said first light modulator to said second light modulator and on a third optical path from said second light modulator to said image plane, said second interface configured to transmit light on one of said second and third light paths and to reflect light on the other of said second and third light paths.

2. The system of claim 1, wherein said first interface is a total internal reflection interface.

3. The system of claim 1, wherein said first interface is a face of a prism.

4. The system of claim 1, wherein said second interface is a total internal reflection interface.

5. The system of claim 1, wherein said second interface is a face of a prism.

6. The system of claim 1, said first and second interfaces separated by a prism.

7. The system of claim 1, comprising an optical system to separate light into separate color components.

8. The system of claim 1, said first and second light modulators having equal resolution.

9. The system of claim 1, said first and second light modulators having unequal resolution.

10. The system of claim 1, at least one of said first and second light modulators spatially modulating light in response to image data.

11. The system of claim 1, at least one of said first and second light modulators comprising a digital micromirror device to spatially modulate light in response to image data.

12. The system of claim 1, comprising an optical system to separate light into separate color components, said first light modulator selectively altering the intensity of said color components, and said second light modulator spatially modulating light in response to image data.

13. The system of claim 1, said first light modulator spatially modulating light in response to image data, and comprising an optical system to separate light into separate color components, said second light modulator selectively altering the intensity of said color components.

14. The system of claim 1, wherein an image of said first light modulator is not in focus at said image plane.

* * * * *